(12) United States Patent
Ryu et al.

(10) Patent No.: US 11,912,733 B2
(45) Date of Patent: Feb. 27, 2024

(54) LHP SYNTHESIS SIMULATING METHOD AND APPARATUS

(71) Applicant: Korea Institute of Science & Technology Information, Daejeon (KR)

(72) Inventors: Hoon Ryu, Daejeon (KR); Ki Ha Hong, Daejeon (KR)

(73) Assignee: Korea Institute of Science & Technology Information (KR)

(*) Notice: Subject to any disclaimer, the term of this patent is extended or adjusted under 35 U.S.C. 154(b) by 498 days.

(21) Appl. No.: 17/285,570

(22) PCT Filed: Sep. 25, 2019

(86) PCT No.: PCT/KR2019/012476
§ 371 (c)(1),
(2) Date: Apr. 15, 2021

(87) PCT Pub. No.: WO2020/080694
PCT Pub. Date: Apr. 23, 2020

(65) Prior Publication Data
US 2022/0064193 A1   Mar. 3, 2022

(30) Foreign Application Priority Data
Oct. 17, 2018   (KR) .................. 10-2018-0123676

(51) Int. Cl.
*C07F 7/24*   (2006.01)
(52) U.S. Cl.
CPC ..................... *C07F 7/24* (2013.01)

(58) Field of Classification Search
CPC .......... C07F 7/24; G02F 1/01791; G02F 2/02; G06N 10/20; G01N 2033/0095; G01N 2033/0091; G01N 33/00; G16C 10/00; G16C 20/30; H01L 28/55
See application file for complete search history.

(56) References Cited

U.S. PATENT DOCUMENTS

| 2020/0161127 A1* | 5/2020 | Irwin | H10K 30/451 |
| 2021/0071075 A1* | 3/2021 | Gautier | C07D 295/02 |

FOREIGN PATENT DOCUMENTS

| CN | 106848076 A | 6/2017 | |
| CN | 107 418 572 A * | 12/2017 | ............ C09K 11/665 |
| CN | 108 101 102 A * | 6/2018 | ............ B82Y 40/00 |
| KR | 100835059 B1 | 6/2008 | |
| KR | 10-2014-0031882 A | 3/2014 | |
| KR | 10-2014-0121061 A | 10/2014 | |
| KR | 101667360 B1 | 10/2016 | |
| KR | 10-2017-0084707 A | 7/2017 | |
| KR | 101919100 B1 | 11/2018 | |
| WO | WO 2018 028 869 A1 * | 2/2018 | ............ C09K 11/66 |
| WO | WO-2018/021975 A1 | 2/2018 | |
| WO | WO 2020 012 194 A1 * | 1/2020 | ............ H01L 51/46 |

* cited by examiner

*Primary Examiner* — Timothy C Vanoy
(74) *Attorney, Agent, or Firm* — FOLEY HOAG LLP (57) ABSTRACT

The present disclosure relates to a lead halide perovskite (LHP) synthesis simulation method, and more particularly to an LHP synthesis simulation method that minimizes a change in wavelength of light emitted from an LHP material when exposed to light for a predetermined time.

13 Claims, 6 Drawing Sheets

LHP SYNTHESIS SIMULATING METHOD AND APPARATUS

RELATED APPLICATIONS

This application is the U.S. National Stage of International Application No. PCT/KR2019/012476, filed Sep. 25, 2019, which designates Korea, published in Korean, and claims priority under 35 U.S.C. 119 or 365(c) to Korean Application No. 10-2018-0123676, filed Oct. 17, 2018. The entire teachings of the above applications are incorporated herein by reference.

TECHNICAL FIELD

The present disclosure relates to a lead halide perovskite (LHP) synthesis simulation method, and more particularly to an LHP synthesis simulation method that minimizes a change in wavelength of light emitted from an LHP material when exposed to light for a predetermined time.

BACKGROUND ART

Various kinds of light sources have been used in lighting equipment and televisions. With development of technology, research on light sources having high durability and long lifespan has been actively conducted.

Accordingly, whether various kinds of materials can be used as light sources has been examined. Thereamong, a lead halide perovskite (LHP) material may include three halogen elements, such as iodine (I), bromine (Br), and chlorine (Cl), as constituents, and has a property of being capable of emitting various colors within a visible light range. Consequently, the LHP material is in the spotlight as a material that is attractive in device design.

In order for the LHP material to be used as a practical light source, however, a problem in which the wavelength of light emitted from the LHP material is changed when exposed to light must be solved.

The above information disclosed in this Background section is provided only for enhancement of understanding of the background of the present disclosure. Whether to apply any part of the above description as conventional art of the present disclosure is not decided or insisted.

DISCLOSURE

Technical Problem

The present disclosure has been made in view of the above problems, and it is an object of the present disclosure to provide a method of minimizing a change in wavelength of light emitted from an LHP material even though exposed to light for a predetermined time when used as a light source.

Technical Solution

An LHP synthesis simulation apparatus according to an embodiment of the present disclosure to accomplish the above object includes a virtual material disposition unit configured to dispose $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell so as to be uniform with each other or to be segregated from each other and a processor configured to calculate an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$ when $CH_3NH_3Pb_3X1_3$ and $CH_3NH_3Pb_3X2_3$ are disposed.

More specifically, the processor may compare energy band gap of the microscopic cell in a case of being disposed to be uniform and energy band gap of the microscopic cell in a case of being disposed to be separated.

More specifically, the microscopic cell may be a quantum dot, and the processor may set the size of the microscopic cell to 3 nm to 15 nm.

More specifically, the processor may set the element symbol of the X1 in a periodic table to be higher than the element symbol of the X2 in the periodic table.

More specifically, the processor may uniformly dispose the $CH_3NH_3Pb_3X1_3$ and the $CH_3NH_3Pb_3X2_3$ at least 100 times repeatedly.

More specifically, the processor may set concentration of the X1 to 10% to 90% compared to the X2

A lead halide perovskite (LHP) synthesis simulation method performed by a processor according to an embodiment of the present disclosure may include disposing $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell of a predetermined size so as to be uniform with each other and calculating an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$.

In addition, a lead halide perovskite (LHP) synthesis simulation method performed by a processor according to an embodiment of the present disclosure may include disposing $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell of a predetermined size so as to be segregated from each other and calculating an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$.

More specifically, the simulation method may further include comparing energy band gaps of the microscopic cell in the case in which the $CH_3NH_3Pb_3X1_3$ and the $CH_3NH_3Pb_3X2_3$ are disposed to be uniform with each other and the case in which the $CH_3NH_3Pb_3X1_3$ and the $CH_3NH_3Pb_3X2_3$ are disposed so as to be segregated from each other.

More specifically, the microscopic cell may be a quantum dot, and the simulation method may further include setting the size of the microscopic cell to 3 nm to 15 nm.

More specifically, the simulation method may further include setting the element symbol of the X1 in the periodic table to be higher than the element symbol of the X2 in the periodic table.

In a computer-readable recording medium having a program configured to be executed by a computer recorded therein according to an embodiment of the present disclosure, the program may include an executable command configured to allow a processor to perform disposing $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell of a predetermined size so as to be uniform with each other or to be segregated from each other and calculating an energy band gap of the microscopic cell based on at least one of shape information, size information, origin information, and material information of the microscopic cell and information about a self-energy band gap of each of $CH_3NH_3Pb_3I_3$, $CH_3NH_3Pb_3Br_3$, and $CH_3NH_3Pb_3Cl_3$, when executed by the processor.

Advantageous Effects

According to various embodiments of the present disclosure, it is possible to simulate, through a computer, performance of an LHP light source when an LHP material is used as a light source without actual experimentation in a laboratory, to minimize a change in wavelength of light emitted from the LHP material even though exposed to light for a predetermined time when the LHP material is used as a light source, and to simulate a change in wavelength of the LHP light source over time through the computer even though the change in wavelength of the LHP light source as the result of being exposed to light over time is not directly measured.

BEST MODE

Technical terms used in this specification are provided merely to describe a specific embodiment, and it should be noted that the technical terms do not limit the technical idea disclosed in this specification. In addition, the technical terms used in this specification must be interpreted as having meanings generally understood by a person having ordinary skill in the art to which the technology disclosed in this specification pertains unless particularly otherwise defined, and must not be interpreted as having excessively comprehensive meanings or excessively reduced meanings. Also, in the case in which the technical terms used in this specification do not exactly express the idea of the technology disclosed in this specification, the technical terms must be replaced with technical terms that those skilled in the art can correctly understand. In addition, general terms used in this specification must be interpreted according to what is defined in a dictionary or according to context, and must not be interpreted as having excessively reduced meanings.

In addition, the singular forms used in this specification are intended to include the plural forms as well, unless the context clearly indicates otherwise. The terms "comprises" and "includes", as used in this specification, must not be interpreted to necessarily include all components or steps described in the specification, and must be interpreted not to include some of the components or the steps or to further include additional components or steps.

In addition, although terms including ordinal numbers, such as "first" and "second," may be used in this specification to describe various components, these components should not be limited by these terms. These terms are only used to distinguish one component from another component. For example, a first element could be termed a second element, and, similarly, a second element could be termed a first element, without departing from the scope of the present disclosure.

Hereinafter, embodiments disclosed in this specification will be described in detail with reference to the accompanying drawings. The same or similar components will be denoted by the same reference numerals, and a duplicate description thereof will be omitted.

Also, in describing technology disclosed in this specification, a detailed description of related known technology will be omitted when it may make the subject matter of the disclosure rather unclear. In addition, the accompanying drawings are provided only for easy understanding of the idea of the technology disclosed in this specification, and therefore it should be noted that the idea of the technology is not limited by the accompanying drawings.

Hereinafter, an embodiment of the present disclosure will be described with reference to the accompanying drawings.

Figure 1:
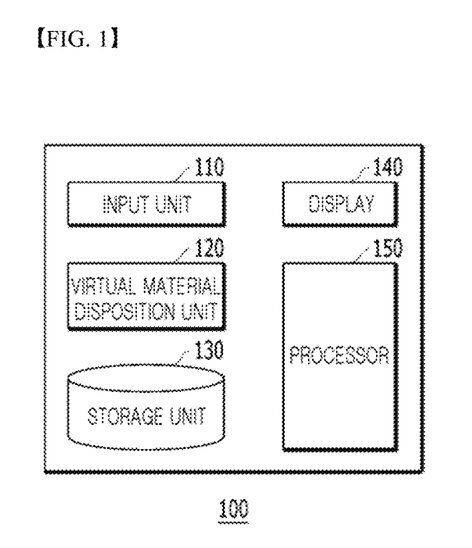
FIG. 1 is a block diagram showing the construction of an LHP synthesis simulation apparatus according to an embodiment of the present disclosure.
Figure 2:
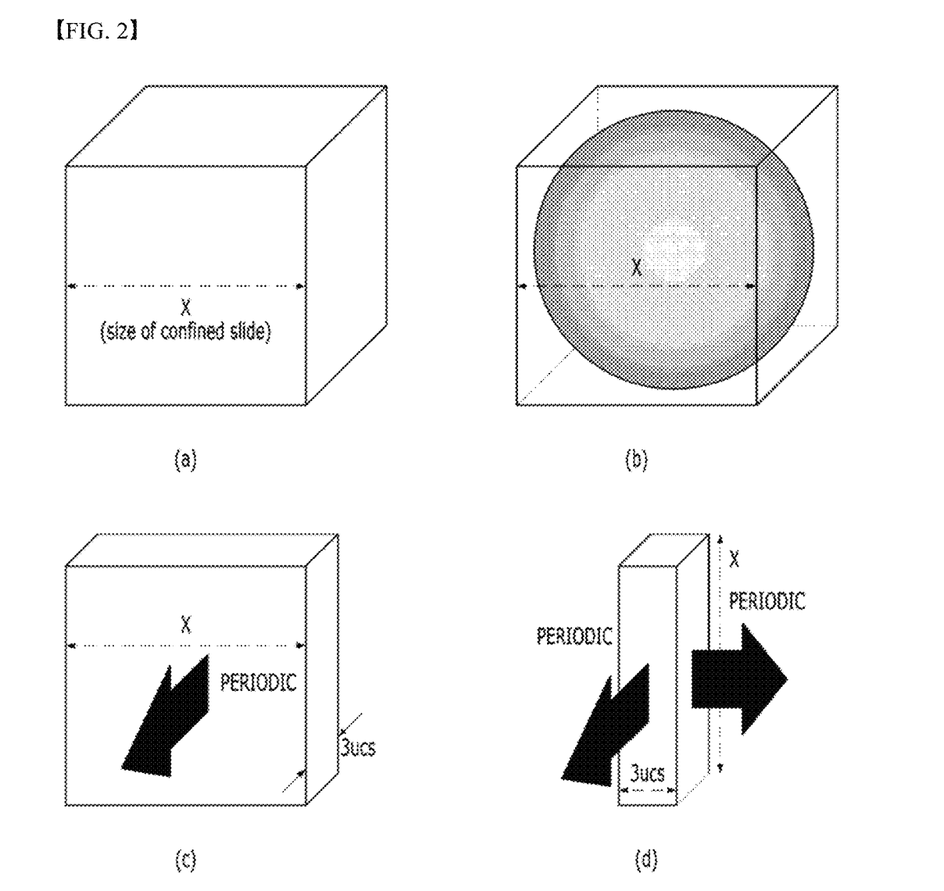
FIGS. 2 to 6 are views illustrating driving of LHP synthesis simulation apparatuses according to various embodiments of the present disclosure.

FIG. 1 is a block diagram showing the construction of an LHP synthesis simulation apparatus 100 according to an embodiment of the present disclosure.

Referring to FIG. 1, the LHP synthesis simulation apparatus 100 includes an input unit 110, a virtual material disposition unit 120, a storage unit 130, a display 140, and a processor 150.

In the first place, an LHP material may be expressed as $CH_3NH_3Pb_3X_3$, wherein $CH_3NH_3$ is methylamine, which is organic matter (simply referred to as MA). Here, X is a halogen material, and may include iodine (I, atomic number 53), bromine (Br, atomic number 35), and chlorine (Cl, atomic number 17); however, X is not necessarily limited to the halogen material.

The LHP synthesis simulation apparatus 100 may virtually synthesize LHP constituents using a high-performance computer, such as a supercomputer, instead of directly composing and synthesizing the LHP constituents through direct experimentation in a laboratory. The LHP synthesis simulation apparatus 100 may appropriately compose and synthesize the X material such that a change in wavelength of light emitted from the LHP is minimized in the case in which the LHP is used as a light source, and therefore the LHP synthesis simulation apparatus may simulate the condition in which the LHP material is suitable to be used as a light source.

Here, the LHP synthesis simulation apparatus 100 may virtually dispose the LHP material ($CH_3NH_3Pb_3X_3$) in a quantum dot, which is a nanometer-sized semiconductor crystal produced through a chemical synthesis process and which is capable of self-emitting light.

The LHP synthesis simulation apparatus 100 does not simulate that the LHP material ($CH_3NH_3Pb_3X_3$) which is uniformly disposed in the quantum dot before exposure to light is gradually exposed to light and is disposed so as to be segregated for each halogen material over time. The LHP synthesis simulation apparatus 100 may separately calculate an energy band gap of the LHP material ($CH_3NH_3Pb_3X_3$) which is uniformly disposed in the quantum dot before exposure to light and an energy band gap of the LHP material ($CH_3NH_3Pb_3X_3$) in the state in which the LHP material is disposed so as to be segregated for each halogen material as the result of being exposed to light.

The LHP synthesis simulation apparatus 100 may calculate band gaps of the LHP material before exposure to light and in the state of being disposed so as to be segregated for each halogen material as the result of being fully exposed to light, although the LHP synthesis simulation apparatus does not directly simulate a change in disposition of the LHP material ($CH_3NH_3Pb_3X_3$) over time, whereby it is possible to simulate a change in disposition of the LHP material ($CH_3NH_3Pb_3X_3$) over time and to simulate a change in wavelength due to a change in disposition.

Hereinafter, the components of the LHP synthesis simulation apparatus 100 will be described in detail.

The input unit 110 is a module configured to allow various kinds of information to be input, and may include a mechanical input means and a touch input means. As an example, the touch input means may be a virtual key displayed on a touchscreen through software processing, a soft key, or a visual key, or may be a touch key disposed on a region other than the touchscreen. Meanwhile, the virtual key or the visual key may be displayed on the touchscreen while having various shapes, and may be constituted by, for example, a graph, text, an icon, video, or a combination thereof.

The input unit 110 may allow the shape of a microscopic cell in which the LHP material is to be disposed to be input. For example, the microscopic cell may be realized so as to have a shape, such as a quantum dot, a spherical quantum dot, a square nanowire, or a planar quantum well, and the size of the microscopic cell may be realized so as to include five unit cells (3 nm) to 30 unit cells (15 nm), which is approximate to a bulk state; however, the size of the microscopic cell is not limited thereto.

The virtual material disposition unit 120 may dispose (mix) the $CH_3NH_3Pb_3X_3$ (where, X is a halogen material) in a microscopic cell (e.g. a quantum dot) such that different halogen materials are mixed two by two, instead of a structure including only one kind of halogen material. For example, the virtual material disposition unit 120 may mix $CH_3NH_3Pb_3I_3$ and $CH_3NH_3Pb_3Br_3$ with each other, may mix $CH_3NH_3Pb_3I_3$ and $CH_3NH_3Pb_3Cl_3$ with each other, and may mix $CH_3NH_3Pb_3Br_3$ and $CH_3NH_3Pb_3Cl_3$ with each other.

In addition, the virtual material disposition unit 120 may segregate two halogen materials into a host material and a visit material while mixing the two halogen materials with each other. For example, when two LHP materials (different $CH_3NH_3Pb_3X3$ materials) are synthesized, the virtual material disposition unit 120 may select I, Br, or Cl as a host halogen material.

In addition, the virtual material disposition unit 120 may differently set the ratio of halogen materials of two LHP materials. For example, in the case in which I and Br are mixed with each other and I is a host material, the virtual material disposition unit 120 may perform simulation in the state in which the concentration of I is differently set to 10% to 90%.

Also, in the case in which two different LHP materials are uniformly mixed with each other, the virtual material disposition unit 120 may calculate a band gap 100 times or more. The reason for this is that, since different energy band gap values may be calculated although the LHP materials are uniformly mixed with each other, it is necessary to calculate the average energy band gap. Actual experiments are performed 100 times. In the case in which the number of experiments is 100 or more, accuracy may be increased.

Also, in the case in which two different LHP materials are mixed with each other so as to be segregated from each other, the virtual material disposition unit 120 may determine that junction between different kinds of materials, i.e. heterojunction, is performed. Heterojunction indicates junction between different kinds of materials. In the case in which different LHP materials are disposed so as to be segregated from each other, heterojunction appears.

Here, the energy band gap is a value indicating the difference between a conduction band (CB) and a valance band (VB), and a more accurate value of the energy band gap may be derived through comparison with a bulk energy band gap of each LHP material. Here, the bulk energy band gap may be a reference energy band gap used to indicate an energy band gap in the case in which only one halogen element is disposed.

Next, the storage unit 130 includes a cache, a main memory, and a secondary memory, but may include a memory hierarchy that is not limited thereto. For example, the memory hierarchy may be realized through an arbitrary combination of a RAM (e.g. an SRAM, a DRAM, or a DDRAM), a ROM, a FLASH memory, and a magnetic and/or optical storage device (e.g. a disk drive, a magnetic tape, a compact disk (CD), or a digital video disc (DVD)), and the storage unit 130 may include various kinds of memories provided in a supercomputer.

The storage unit 130 may store information about the bulk energy band gap, and may include at least one type of storage medium selected from among a flash memory type, hard disk type, solid state disk type, silicon disk drive type), multimedia card micro type, or card type memory (e.g. an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc.

The display may be realized by at least one of a liquid crystal display (LCD), a thin film transistor-liquid crystal display (TFT LCD), an organic light-emitting diode (OLED) display, a flexible display, a three-dimensional display (3D display), and an electronic ink display (e-ink display).

The display 140 may provide various kinds of information to a screen under control of the processor 150.

The processor 150 is a module corresponding to a brain that generally controls the LHP synthesis simulation apparatus 100, and, in the case in which LHP materials including different halogen materials are simultaneously disposed in a microscopic cell, may calculate information about energy band gaps of the LHP materials including different halogen materials based on at least one of shape information, size information, origin information, and material information of the microscopic cell.

In addition, the processor 150 may more accurately calculate information about the energy band gaps of the different LHP materials through comparison between the calculated information about the energy band gaps of the different LHP materials and information about band gaps of $CH_3NH_3Pb_3I_3$, $CH_3NH_3Pb_3Br_3$, and $CH_3NH_3Pb_3Cl_3$ (bulk band gap information).

The processor 150 may calculate information about the energy band gaps of the different LHP materials using a tight binding method. The tight binding method, which is a method of quantum equation calculation, is a method of constituting a determinant for quantum equation calculation, and is a method of deriving a numerical formula necessary for Schrödinger equation calculation. At this time, in order to derive the numerical formula, at least one of shape information, size information, origin information, and material information of a quantum structure may be included as an input value.

Hereinafter, driving of the LHP synthesis simulation apparatus 100 according to the embodiment of the present disclosure will be described with reference to FIGS. 2(a) to 6. For reference numerals, the reference numerals of FIG. 1 are also referred to.

Referring to FIGS. 2(a) to 2(d), a microscopic cell may be realized in the shape of a hexahedral quantum dot ((a)), a spherical quantum dot ((b)), a square nanowire ((c)), or a planar quantum well ((d)). Here, the length (size) of X is a minimum of 3 nm to a maximum of 15 nm, and the length corresponds to a length (size) simulated actually. Depending on embodiments, however, X may be realized as a value of 3 nm or less, or X may be realized as a value of 15 nm or more. X may be realized as the length of one surface of a hexahedron.

Figure 3:
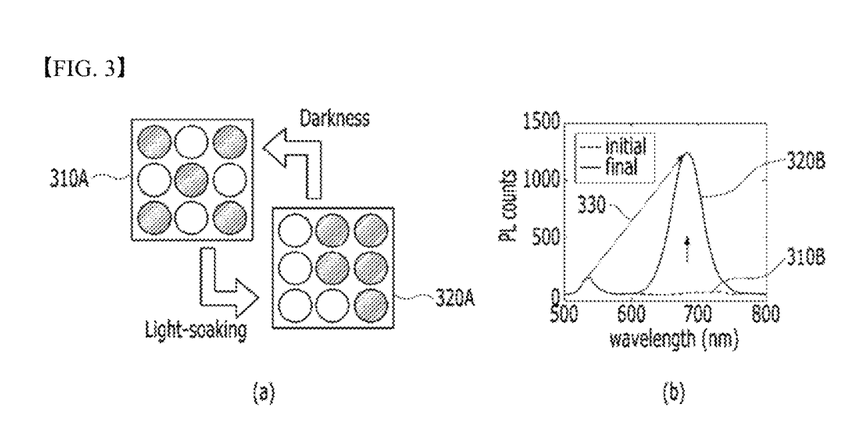

Referring to FIGS. 3(a) and 3(b), first, the processor 150 may dispose LHP materials in a microscopic cell in the state in which a halogen material is uniform (310A). When exposed to light, the processor 150 may dispose the LHP materials in the state of being segregated from each other (320A). When light is blocked again, the processor 150 may dispose LHP materials in a microscopic cell in a uniform state (310). That is, the processor 150 may dispose the LHP materials included in the microscopic cell over time.

Also, in the case of the wavelength of light emitted from the LHP materials, a first wavelength (310B) may be observed in the initially uniform state (310A), and the wavelength may be changed to a second wavelength (320B) in the segregated state (320A). Such a change, which is movement of a red wavelength, may be expressed as Red Shift.

Figure 4:
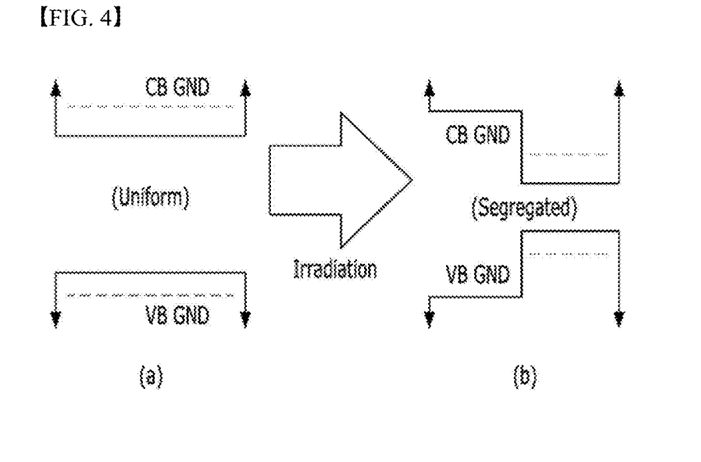

Referring to FIGS. 4(a) and 4(b), an energy band gap in the case in which the LHP materials are uniformly mixed with each other ((a)) may be set to an energy band gap in the case in which the LHP materials are mixed with each other so as to be slowly segregated from each other ((b)) over time.

Figure 5:
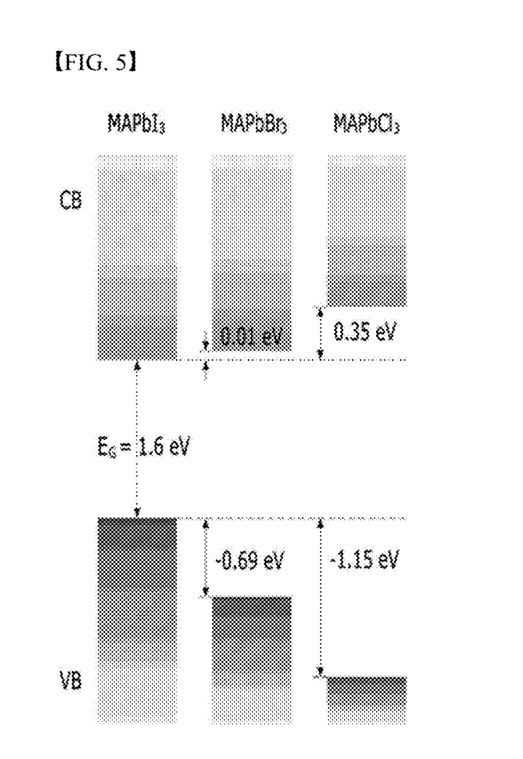

FIG. 5 shows an energy band gap (bulk energy band gap) in the case in which only one halogen material is included. Referring to FIG. 5, an energy band gap may be observed to be the smallest for I, and an energy band gap may be observed to be the largest for Cl.

Figure 6:
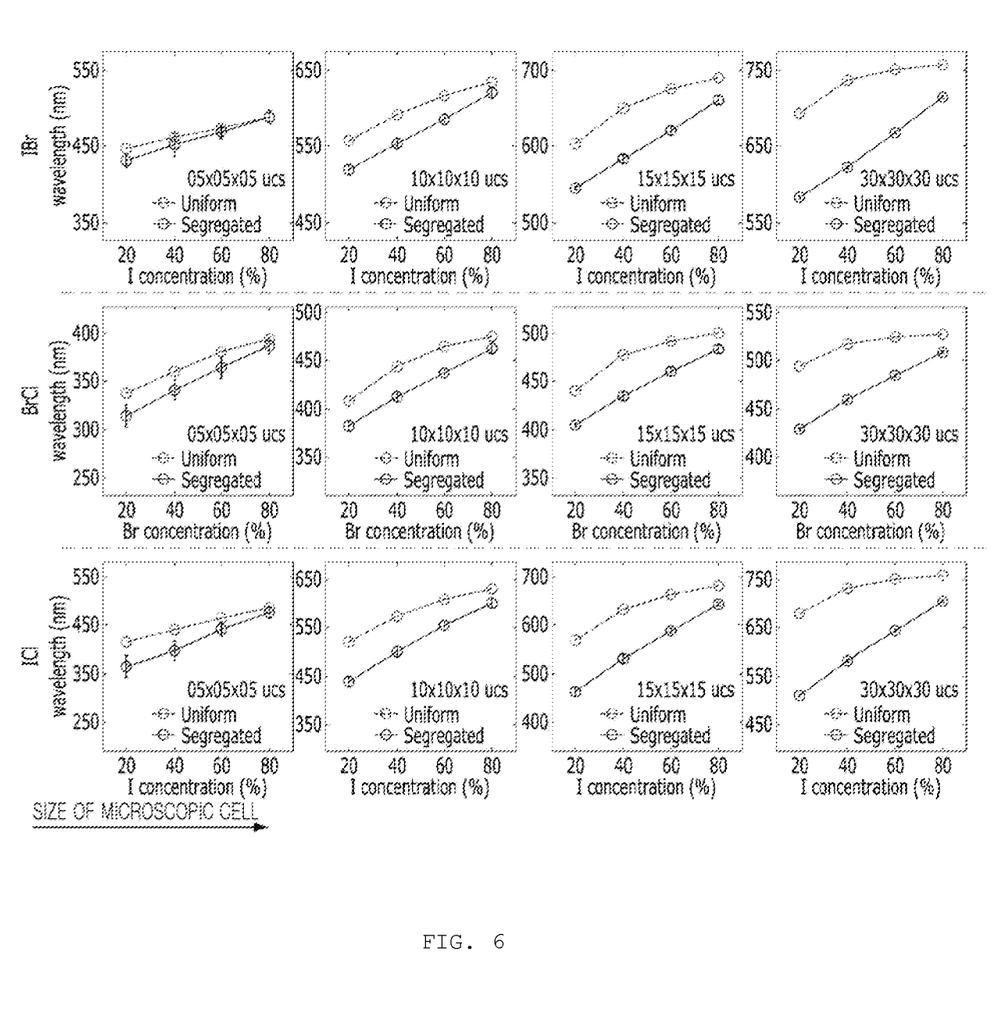

FIG. 6 is graphs showing the cases in which different LHP materials are mixed with each other, and shows a wavelength based on the concentration of a host material in the case in which I and Br are mixed with each other (IBr), the case in which Br and Cl are mixed with each other (BrCl), and the case in which I and Cl are mixed with each other (IC).

Here, the case in which the LHP materials are uniformly mixed with each other may be indicated by a red color, and the case in which the LHP materials are mixed with each other so as to be segregated from each other may be indicated by a blue color. In addition, each graph may be displayed in the direction in which the size of a microscopic cell is increased. For example, four cases (5, 10, 15, 30 unit cells) from five unit cells (3 nm) to 30 unit cells (15 nm) may be displayed as graphs.

Referring to FIG. 6, in the case in which the size of the microscopic cell is small, that the difference between an energy band gap in a uniformly mixed state and an energy band gap in a state of being mixed so as to be segregated is small may be displayed. That is, for IBr, the difference between energy band gaps in the case in which the number of unit cells is 5 may be observed to be the smallest.

Also, in the case in which a large amount of a halogen material having a low energy band gap is included even though the microscopic cells are the same size, that the difference between an energy band gap in a uniformly mixed state and an energy band gap in a state of being mixed so as to be segregated is small may be observed. For example, for IBR and ICL, each of which has I as a host material, the difference between energy band gaps in the case of IBr having a small difference between energy band gaps may be observed to be small. Also, in comparison between BrCl and ICl, ICl, in which I having a lower energy band gap is disposed, shows a lower difference between energy band gaps.

In the case in which the difference between an energy band gap in a uniformly mixed state and an energy band gap in a state of being mixed so as to be segregated is observed to be small, as described above, a change in wavelength is not large. When actually used as a light source, therefore, a light source having uniform brightness may be acquired.

Meanwhile, embodiments of a functional operation and subject described in this specification may be implemented by a digital electronic circuit, may be implemented by computer software, firmware, or hardware including a structure disclosed in this specification and structural equivalents thereto, or may be implemented by a combination of one or more thereof. The embodiments of a subject described in this specification may be implemented as one or more computer program products, in other words one or more modules for computer program commands encoded in a concrete program storage medium in order to control the operation of a processing system or to be executed thereby.

A computer-readable medium may be a storage device that is readable by a machine, a storage board that is readable by a machine, a memory device, a composition of a material that affects a radio wave type signal that is readable by a machine, or a combination of one or more thereof.

In this specification, the "system" or "apparatus" embraces all tools, instruments, and machines that process data, including a programmable process, a computer, or multiple processors or computers. A processing system may include code that forms an execution environment for a computer program, such as code constituting processor firmware, a protocol stack, a database management system, an operating system, or a combination of one or more thereof, when requested, in addition to hardware.

A computer program (also known as a program, software, a software application, a script, or code) may be prepared in any form of a programming language including a complied or interpreted language or a transcendental or procedural language, and may be developed in any form including a standalone program, a module, a component, a subroutine, or another unit suitable to be used in a computer environment. The computer program does not necessarily correspond to a file of a file system. The program may be stored in a single file provided to a requested program, in multiple files that interact with each other (e.g. one or more modules, a low-level program, or a file that stores a part of code), or in a part of file having another program or data (e.g. one or more scripts stored in a markup language document). The computer program may be located at one site or may be distributed over a plurality of sites, and may be developed so as to be executed by multiple computers connected to each other over a communication network or a single computer.

Meanwhile, a computer-readable medium suitable to store computer program commands and data may include a semiconductor memory device, such as an EPROM, an EEPROM, or a flash memory device, a magnetic disk, such as an internal hard disk or an external disk, and all kinds of non-volatile memories, media, and memory devices, including a magnetic-optical disk, a CD-ROM, and a DVD-ROM. A processor and a memory may be supplemented by a special purpose logic circuit or may be integrated into the special purpose logic circuit.

An embodiment of a subject described in this specification may be implemented in a calculation system including a backend component, such as a data server, including a middleware component, such as an application server, including a frontend component, such as a client computer having a web browser capable of interacting with the embodiment of the subject described in this specification or a graphical user interface, or all combinations of one or more of the backend, middleware, and frontend components. The components of the system can be connected to each other via any form or medium of digital data communication, such as a communication network.

This specification includes details of a plurality of specific embodiments. However, these must not be understood to be restrictive to the scope of any invention or what is capable of being claimed, but rather must be understood as a description of features peculiar to a specific embodiment of a specific invention. In the same manner, specific features described in this specification may be combined and implemented in a single embodiment in the context of an individual embodiment. In contrast, various features described in the context of a single embodiment may also be implemented in a plurality of embodiments individually or in any appropriate lower-level combination. Furthermore, although features are operated in a specific combination and are initially described like what is claimed, one or more features from the claimed combination may be excluded from the combination in some cases, and the claimed combination may be changed to a lower-level combination or a modification of the lower-level combination.

Also, in this specification, although operations are shown in a specific sequence in the drawings, this does not mean that the operations must be performed in the specific sequence or sequentially in order to obtain desired results or that all of the operations must be performed. In a specific case, multitasking and parallel processing may be advantageous. In addition, division between various system components in the above embodiment must not be understood to be required in all embodiments, and it should be understood that the described program components and systems can generally be integrated into a single software product or can be packaged into multiple software products.

As described above, this specification does not intend to limit the present disclosure by the suggested concrete terms. Although the present disclosure has been described in detail with reference to the above examples, therefore, it is possible for those skilled in the art to modify, change, or alter the examples without departing from the scope of the present disclosure. The scope of the present disclosure is limited by the appended claims, rather than the detailed description, and it should be interpreted that all changes or modifications derived from the meaning and scope of the claims and the equivalent concept thereof fall within the scope of the present invention.

The invention claimed is:

1. A lead halide perovskite (LHP) synthesis simulation apparatus comprising:
    a virtual material disposition unit configured to dispose $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (CO, which is different from the X1) in a microscopic cell so as to be uniform with each other or to be segregated from each other; and
    a processor configured to calculate an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$ when $CH_3NH_3Pb_3X1_3$ and $CH_3NH_3Pb_3X2_3$ are disposed.

2. The LHP synthesis simulation apparatus according to claim 1, wherein the processor compares energy band gap of the microscopic cell in a case of being disposed to be uniform and energy band gap of the microscopic cell in a case of being disposed to be separated.

3. The LHP synthesis simulation apparatus according to claim 1, wherein
    the microscopic cell is a quantum dot, and
    the processor sets a size of the microscopic cell to 3 nm to 15 nm or sets the size of the microscopic cell to 3 nm.

4. The LHP synthesis simulation apparatus according to claim 1, wherein the processor sets an element symbol of the X1 in a periodic table to be higher than an element symbol of the X2 in the periodic table.

5. The LHP synthesis simulation apparatus according to claim 1, wherein the processor uniformly disposes the $CH_3NH_3Pb_3X1_3$ and the $CH_3NH_3Pb_3X2_3$ at least 100 times repeatedly.

6. The LHP synthesis simulation apparatus according to claim 1, wherein the processor sets concentration of the X1 to 10% to 90% compared to the X2 or sets the concentration of the X1 to 90% compared to the X2.

7. A lead halide perovskite (LHP) synthesis simulation method performed by a processor, the LHP synthesis simulation method comprising:
    disposing $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell of a predetermined size so as to be uniform with each other; and
    calculating an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$.

8. The LHP synthesis simulation method according to claim 7, further comprising comparing energy band gaps of the microscopic cell in a case in which the $CH_3NH_3Pb_3X1_3$ and the $CH_3NH_3Pb_3X2_3$ are disposed to be uniform with each other and a case in which the $CH_3NH_3Pb_3X1_3$ and the $CH_3NH_3Pb_3X2_3$ are disposed so as to be segregated from each other.

9. The LHP synthesis simulation method according to claim 8, wherein
    the microscopic cell is a quantum dot, and
    the LHP synthesis simulation method further comprises setting a size of the microscopic cell to 3 nm to 15 nm or setting the size of the microscopic cell to 3 nm.

10. The LHP synthesis simulation method according to claim 8, further comprising:
    setting an element symbol of the X1 in a periodic table to be higher than an element symbol of the X2 in the periodic table; and
    setting concentration of the X1 to 90% compared to the X2.

11. A lead halide perovskite (LHP) synthesis simulation method performed by a processor, the LHP synthesis simulation method comprising:

disposing $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell of a predetermined size so as to be segregated from each other; and calculating an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$.

12. The LHP synthesis simulation method according to claim 11, further comprising comparing energy band gaps of the microscopic cell in a case in which the $CH_3NH_3Pb_3X1_3$ and the $CH_3NH_3Pb_3X2_3$ are disposed to be uniform with each other and a case in which the $CH_3NH_3Pb_3X1_3$ and the $CH_3NH_3Pb_3X2_3$ are disposed so as to be segregated from each other.

13. A computer-readable recording medium having a program configured to be executed by a computer recorded therein, wherein the program comprises an executable command configured to allow a processor to perform when executed by the processor:

disposing $CH_3NH_3Pb_3X1_3$ (where X1 is one of iodine (I), bromine (Br), and chlorine (Cl)), as a host material, and $CH_3NH_3Pb_3X2_3$ (where X2 is one of iodine (I), bromine (Br), and chlorine (Cl), which is different from the X1) in a microscopic cell of a predetermined size so as to be uniform with each other or to be segregated from each other; and calculating an energy band gap of the microscopic cell based on at least one of shape information, size information, origin information, and material information of the microscopic cell and information about an energy band gap of each of $CH_3NH_3Pb_3I_3$, $CH_3NH_3Pb_3Br_3$, and $CH_3NH_3Pb_3Cl_3$.

* * * * *